United States Patent [19]

Andrianos

[11] Patent Number: 4,999,534
[45] Date of Patent: Mar. 12, 1991

[54] ACTIVE VIBRATION REDUCTION IN APPARATUS WITH CROSS-COUPLING BETWEEN CONTROL AXES

[75] Inventor: Nikos P. Andrianos, Pittsburgh, Pa.

[73] Assignee: Contraves Goerz Corporation, Pittsburgh, Pa.

[21] Appl. No.: 466,133

[22] Filed: Jan. 19, 1990

[51] Int. Cl.⁵ .................. G05B 11/32; H02K 5/24
[52] U.S. Cl. .................. 310/90.5; 310/51; 318/114; 318/128; 318/649
[58] Field of Search .............. 73/650, 660; 310/15, 310/51, 90.5; 318/114, 128, 628, 632, 649; 381/71

[56] References Cited

U.S. PATENT DOCUMENTS

| | | | |
|---|---|---|---|
| 4,121,143 | 10/1978 | Habermann et al. | 318/629 |
| 4,153,815 | 5/1979 | Chaplin et al. | 179/1 P |
| 4,244,629 | 1/1981 | Habermann | 310/90.5 |
| 4,417,098 | 11/1983 | Chaplin et al. | 381/94 |
| 4,490,841 | 12/1984 | Chaplin et al. | 381/71 |
| 4,566,118 | 1/1986 | Chaplin et al. | 381/71 |
| 4,600,863 | 7/1986 | Chaplin et al. | 318/114 |
| 4,626,754 | 12/1986 | Habermann et al. | 318/460 |
| 4,677,353 | 6/1987 | Shieh | 318/128 |
| 4,839,550 | 6/1989 | Mizund et al. | 310/90.5 |
| 4,862,506 | 8/1989 | Landgarten et al. | 381/71 |
| 4,929,874 | 5/1990 | Mizuno et al. | 318/649 |

OTHER PUBLICATIONS

"Application of Magnetic Bearing Technology for Vibration Free Rotating Machinery", T. A. Hendrickson, J. S. Leonard & D. A. Weise, Naval Engineers Journal, May 1987, pp. 107-111.

"Fast Algorithms in Active Noise or Vibration Control", Alain Roure, IEEE 1988, pp. 2582-8585.

Primary Examiner—Peter S. Wong
Assistant Examiner—D. L. Rebsch
Attorney, Agent, or Firm—Webb, Burden, Ziesenheim & Webb

[57] ABSTRACT

An apparatus for cancellation of vibrations in a device. A first matrix (51) combines the vibration signals from a plurality of locations to produce mode signals indicative of individual modes of vibration of said device. An adaptive element in response to said mode signals generates mode vibration attenuation signals corresponding to said mode signals. A second matrix (56) combines the mode vibration attenuation signals to produce vibration attenuation signals for generating vibration attenuation forces.

11 Claims, 5 Drawing Sheets

ACTIVE VIBRATION REDUCTION IN APPARATUS WITH CROSS-COUPLING BETWEEN CONTROL AXES

BACKGROUND OF THE INVENTION

The present invention relates to the cancellation of vibrations in devices such as machinery. Many machines or machine elements have a periodic disturbing force applied to them which excites vibrations therein. For example, the imbalance in the rotor of a rotating machine will cause a periodic disturbing force to be applied to the stator. The disturbing force is transmitted through the bearings at the frequency of revolution of the rotor. In fact, the disturbing force can be, and usually is, much more complicated. Typically, the disturbing force also excites vibrations in the stator at frequencies which are harmonics of the frequency of revolution of the rotor (the fundamental frequency). Another example of a device in which a periodic disturbing force excites vibrations is an electrical transformer caused to vibrate at the frequency of the alternating currents flowing therein and at harmonics thereof.

It has been known to attempt to cancel or compensate for the periodic disturbing force applied to a vibrating system in order to attenuate the vibrations therein. In the most simple of systems, a compensating force is applied between a reacting mass and the vibrating device. The theory can be explained with reference to FIG. 1., A periodic disturbing force $F_D(\omega t)$ acts upon the vibrating mass M which is supported on an elastic foundation K. The vibrations or periodic movements of the vibrating mass M take place in the direction of the arrow X. If a force $F_2(\omega t)$ equal and opposite to the disturbing force acts between the vibrating mass M and an auxiliary reacting mass $M_2$, the vibration of mass M can be attenuated. Of course, the reacting mass will have a reciprocating motion $X_2$. One method of creating the compensating force $F_2(\omega t)$ is with an electromagnet actuator placed between masses M and $M_2$. FIG. 2 schematically illustrates the use of auxiliary reacting masses $M_R$ positioned between electromagnets 10 in the stator 11 of a rotating machine for cancellation of vibrations caused by disturbing forces transmitted to the stator from the rotor 12 through the bearings 13, 14.

It is not necessary to use auxiliary reacting masses. The mass causing the disturbing force may itself be used as the reacting mass. This is especially the case where the rotor of a rotating machine is supported by active electromagnetic bearings. FIG. 3 illustrates a rotating machine having active magnetic bearings 15, 16. The rotor 12 is used as the reacting mass. This approach has the advantage of attacking the vibration at the source. In a variation of this scheme, the rotor is supported in its normal location by fluid bearings and the electromagnets are simply used to generate the compensating forces to attenuate the vibrations in the stator.

The compensating force ($F_2(\omega t)$ in FIG. 1) must be applied at the correct amplitude and phase if the vibrations in the vibrating mass are to be attenuated. If vibrating devices were perfectly rigid and perfect accelerometers and actuators existed with fixed gain and no phase delay, then finding the correct amplitude and phase for the signal applied to the actuator to generate the compensating force would be a simple matter—at least if only the fundamental frequency need be considered. The dynamics of the system which includes the actuator, the vibrating mass and the accelerometer are not so simple. For every system there exists a transfer function which defines the relation between the input signal to the actuator and the output signal of the accelerometer. The transfer function defines a unique gain (ratio of the amplitude of the input signal to the amplitude of the output signal) and phase shift (electrical degrees between the input signal and the output signal) for every frequency of the input signal. FIG. 4 is a graph of an input signal and an output signal for the purpose of illustrating gain and phase shift. FIG. 5 illustrates a hypothetical transfer function showing the relation of gain and phase delay versus frequency. The transfer function for a vibrating device would most certainly be more complicated. As a practical matter, the transfer function may be difficult to calculate from measured system parameters. In general, however, as frequency increases beyond a certain threshold, the output signal will lag the input signal, and beyond another threshold the amplitude of the output signal will decrease.

The manner in which the dynamics of the system complicate the generation of the compensating force becomes apparent when considering that a compensating force must be created for vibrations at the fundamental frequency and each harmonic. The gain and phase delay are different for each compensating signal applied to the actuator, and the transfer function cannot be defined by calculation. This problem, however, was solved by the adaptive vibration control circuit or adaptive controller.

An adaptive controller is described in Chaplin and Smith U.S. Pat. No. 4,490,841 entitled "Method and Apparatus for Cancelling Vibrations." The adaptive controller accepts as an input signal, a signal generated by an accelerometer which contains components at the fundamental frequency and all harmonics at which vibrations have been excited. A reference signal at the fundamental frequency of the disturbing force is also accepted by the adaptive controller. The adaptive controller first performs a Fourier Transform upon the accelerometer signal to identify the amplitude and phase of the spectral components of the signal corresponding to vibrations at the fundamental frequency and each harmonic (say the first four or five harmonics). For each spectral signal the adaptive controller modifies the amplitude and phase in an attempt to generate an input signal to the actuator (electromagnet generating the compensating force) that will attenuate the vibrations at that frequency. The modified spectral signals are combined by an inverse Fourier Transform and are applied as a drive signal to the actuator. By successive trial and error, the adaptive controller finds the correct modifications for each spectral component to reduce the vibrations corresponding to that frequency. The trial and error method applied separately to each spectral component eliminates any need for prior knowledge of the complex transfer function of the device. If only vibrations at the fundamental frequency are of concern, the adaptive controller can be greatly simplified. The Fourier Transform to identify spectral components can be eliminated.

FIG. 6 schematically illustrates the application of an adaptive controller to compensate for the horizontal vibrations transferred to a stator from a rotor journaled in a magnetic bearing. The magnetic bearing comprises four electromagnet poles 20, 21, 22, and 23 mounted in the stator (not shown) and spaced at 90 degrees to each other surrounding the rotor 12. The rotor has a ferrous (magnetic) outer ring in close proximity to the poles. The attractive force of each magnet is controlled by the currents $Iy_1$, and $Iy_2$ flowing in the magnet coils 24, 25. By carefully adjusting the currents in each magnet coil, the forces on the rotor can be brought into balance and, in theory, the rotor could stay at rest in a levitated state. However, this balanced condition represents an unstable equilibrium because the attractive forces of each electromagnet varies inversely with the distance between the pole and the rotor. Consequently, if the rotor moves an infinitesimal distance in any radial direction, the forces will become unbalanced. Thus, in order to maintain a stable state, it is necessary to use a feedback control circuit. The position of the rotor relative to the magnet poles is detected by position sensors. Only the position sensors 26, 27 and feedback control circuit for the vertical direction are shown in FIG. 6. Typical position sensors comprise inductive or eddy current type devices in combination with a high frequency source 28 of excitation and a demodulator 29 as schematically shown in the figure. The vertical shaft position (the "Y" position) is subtracted from a vertical reference signal at summing junction 30 to generate an error signal. The error signal drives the current applied to the magnet coils in the direction to reduce the error signal to near zero. The compensation block 31 in the forward path of the control circuit is a common device to overcome the problems introduced by the destabilizing inverse-force relationship in the electromagnets.

The adaptive controller 33 receives the acceleration signals from the accelerometers 34 (only one shown) mounted at the location where vibration is to be reduced. In this case the accelerometers are mounted to sense accelerations in the vertical direction. It also receives a speed signal which is representative of the frequency of rotation of the rotor (the fundamental frequency of the periodic disturbing force). The adaptive controller determines the amplitude and phase of the fundamental and each harmonic as high as, say, 600 Hertz. It then computes the cancellation wave shapes to inject into the magnetic bearing system (at summing junction 35) by a trial and error method to eliminate vibrations. Reductions on the order of 100 to 1 (40 dB) have been observed.

In a rotating machine wherein the rotor is suspended by two spaced radial bearings and one axial thrust bearing, there are five degrees of freedom addressed by the bearing system. Referring to FIG. 7, the degrees of freedom comprise perpendicular diametral displacements (X and Y displacements) at each radial bearing and an axial or Z displacement. Therefore, the magnetic bearing suspension system must comprise five independent position feedback control loops. The five degrees of freedom of the rotor 12 may be identified with five disturbing forces applied to the stator through the magnetic bearings each of which individually or in combination excite vibrations in the stator. To cancel all of the vibrations, accelerometers and adaptive controllers must be associated to some extent with each oppositely-positioned pair of electromagnets for each radial bearing. Such a system could effectively cancel the rigid body modes of vibration of the stator structure if the relationships between disturbing forces at the bearings and the vibrations sensed by the accelerometers at the bearings were substantially decoupled amongst the various axes of control. Unfortunately, in real life systems, there is a significant amount of cross-coupling amongst the axes of control. For example, a vibration-cancelling force introduced in the $X_1$ axis may cause the vibration at $X_2$, $Y_1$, and $Y_2$ to increase.

Cross-coupling can exist for many reasons, e.g., non-symmetrical stator geometry relative to the rotor; center of gravity not on the axis of rotation; cantilevered support at the base; and nonsymmetrical stiffnesses in apparatus structure.

For example, in a rotating machine of the type being described with five degrees of freedom, there exists cross-coupling of forces applied to the rotor by each electromagnetic pole pair and the change in the gap of all pole pairs. This cross-coupling does not have a substantial effect on the bearing suspension system but is an impediment to the reduction of vibrations. The Chaplin and Smith patent discloses two approaches to multiple interacting systems. One involves an iterative process of considering one accelerometer actuator pair at a time. The other comprises premeasuring the cross-coupling coefficients between each actuator (electromagnet pair in the example of FIG. 6) and sensor and performing matrix operations to deduce the required cancellation signal on each cancelling actuator. A single adaptive controller is then associated with each actuator. This approach does not adequately address the dynamic nature of the cross-coupling.

The prior art fails to adequately address the dynamic cross-coupling in the vibrating device. Hence, cancellation of vibrations in complex systems cannot be achieved.

SUMMARY OF THE INVENTION

It is an object according to this invention, to provide an improved method and apparatus for the cancellation of vibrations in a device by identification of the modes of vibration within the device and the manner in which those modes of vibration cause accelerations at each vibration control location.

It is a further object, according to this invention, to use a matrix operation to isolate the vibration signals associated with each mode of vibration to be cancelled from the accelerometer signals and to use a single adaptive controller for each mode of vibration followed by an inverse matrix operation to derive signals for driving each actuator.

Briefly, according to this invention, there is provided a method and apparatus for cancelling vibrations in a device that is subject to a periodic disturbing force. A plurality of actuators for applying cancellation forces where they can effectively offset the disturbing forces applied to the device. Associated with each axis of vibration control is a vibration sensor, preferably an accelerometer for sensing the vibrations at those locations. A sensor is provided for generating a signal indicative of the fundamental frequency of the disturbing force. A decoupling circuit is provided for taking the plurality of signals generated by the vibration sensors and generating a plurality of signals each corresponding to a single independent mode of vibration in the device. Circuits are provided for translating the plurality of mode signals into a plurality of force cancellation signals. Preferably, an adaptive controller is associated with each vibration mode signal for isolating the spectral components of the vibrations in that mode and for generating force cancellation signals for each spectral component by a trial and error process. The spectral components of the force cancellation signals are inverse transformed into a combined force cancellation signal for each mode. The cancellation signals for each mode are then coupled by a coupling circuit to generate driving signals for each actuator. Preferably, the actuators are electromagnetic devices for applying a force between the device in which vibration is being controlled and a reaction mass.

According to a preferred embodiment, the decoupling device operates by performing a matrix operation and the coupling device by performing the inverse matrix operation.

Preferably, for an embodiment of this invention for controlling the vibrations in the stator of a rotating machine having two radial bearings, the vibration modes of the stator isolated by the decoupling device comprise two perpendicular rigid body displacement modes and two rigid body titling (rocking) modes that take place in perpendicular planes intersecting at the nominal position of the axis of rotation or subcombinations of these modes.

Preferably, for an embodiment of this invention for controlling the vibrations in the stator of a rotating machine having three radial bearings spaced along the rotor and an axial bearing, the vibration modes of the stator isolated by the decoupling device comprise three rigid body translation modes, two rigid body tilting modes, and two bending (banana) modes or subcombinations thereof.

Preferably, for embodiments of this invention for controlling vibrations in the stators of rotating machinery, the actuators are the electromagnetic poles of magnetic bearings and the reaction mass is the rotor.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 6:
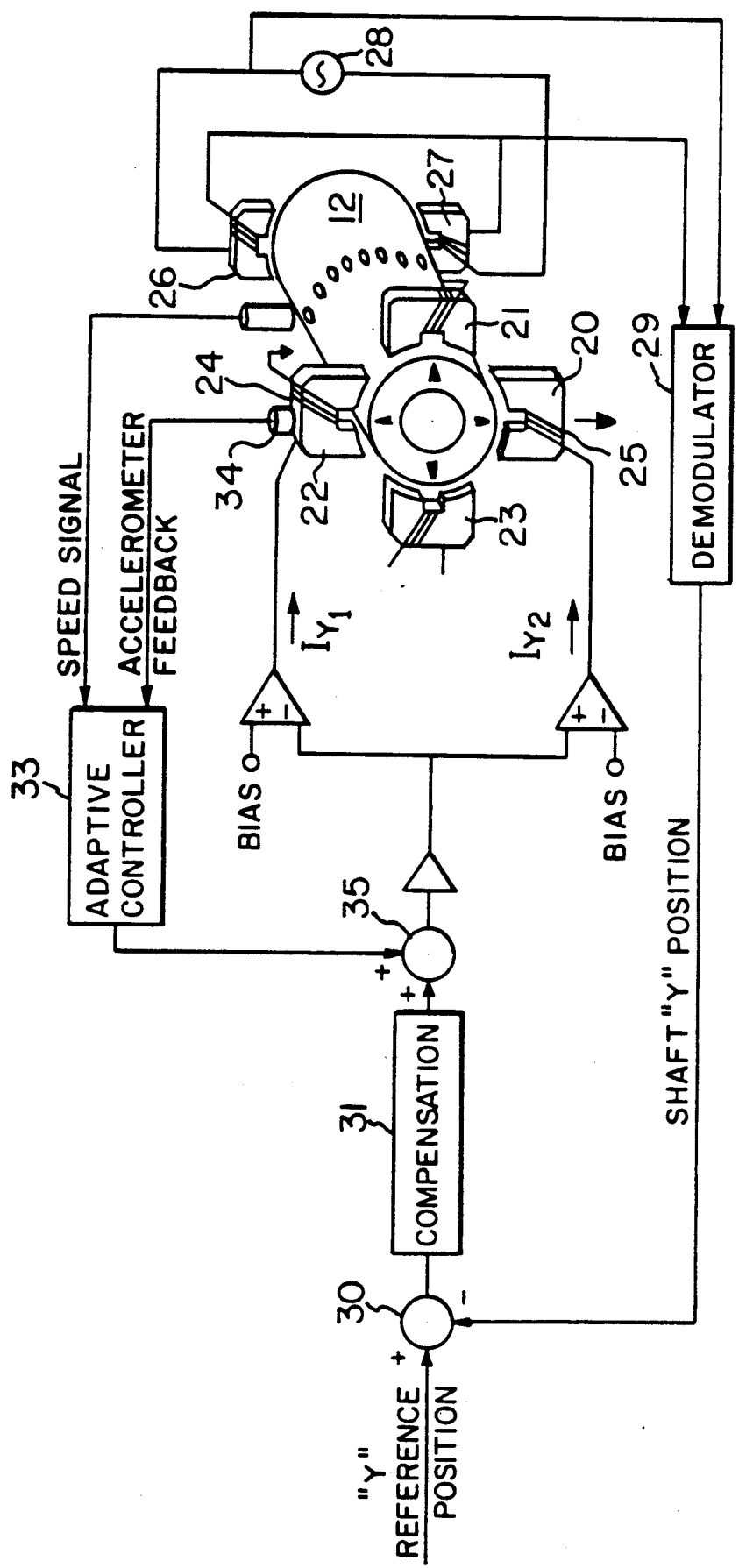
FIG. 6 is a schematic diagram which illustrates the application, as suggested by the prior art, of an adaptive controller to attenuate vibrations.
Figure 8:
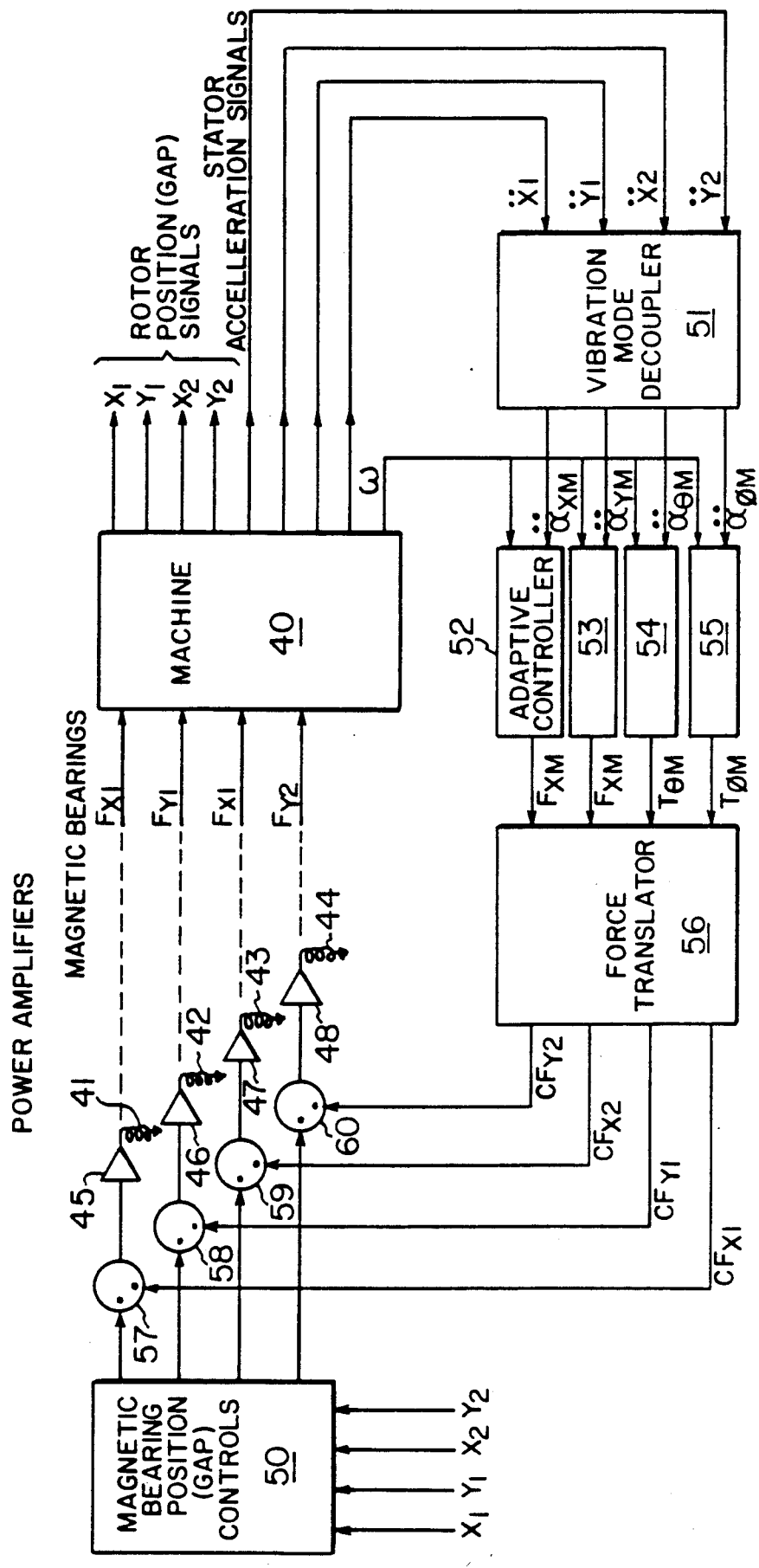
FIG. 8 is a schematic diagram (Bode diagram) illustrating the elements of this invention.

Referring now to FIG. 8, the interconnection of the elements of a vibration attenuation system according to this invention is set forth. The stator of the rotating machine 40 supports the rotor (not shown) by spaced magnetic bearings. The rotor applies a periodic disturbing force to the stator at frequency $\omega$ and harmonics thereof. Each bearing has a pair of X-direction electromagnets and a pair of Y-direction electromagnets (as shown in FIG. 6). The first bearing exerts forces $F_{X1}$ and $F_{Y1}$. The second bearing exerts forces $F_{X2}$ and $F_{Y2}$ to maintain the rotor in its radial position. Magnetic forces $F_{X1}$, $F_{X2}$, $F_{Y1}$ and $F_{Y2}$ are created by current flowing in coils 41, 42, 43 and 44. The current in each coil is controlled by amplifiers 45, 46, 47 and 48, respectively. As with bearings described with reference to FIG. 6, the bearings are position feedback controlled. Position sensors which are part of the machine 40 produce gap signals $X_1$, $Y_1$, $X_2$ and $Y_2$ which are applied to the magnetic bearing gap control circuit 50.

Accelerometers which are part of the machine 40 produce signals $X_1$, $Y_1$, $X_2$ and $Y_2$ corresponding to the accelerations along the axes of forces $F_{X1}$, $F_{Y1}$, $F_{X2}$, $F_{Y2}$, respectively. A signal $\omega$ indicative of the fundamental frequency of the disturbing forces also generated by a pickup that is part of the machine 40. To this point, the system is described with reference to FIG. 8 is substantially identical to the prior art system described with reference to FIG. 6.

The acceleration signals are applied to the vibration mode decoupler 51 which performs a matrix operation to produce acceleration signals corresponding to the four principal vibration modes of the stator.

Figure 9:
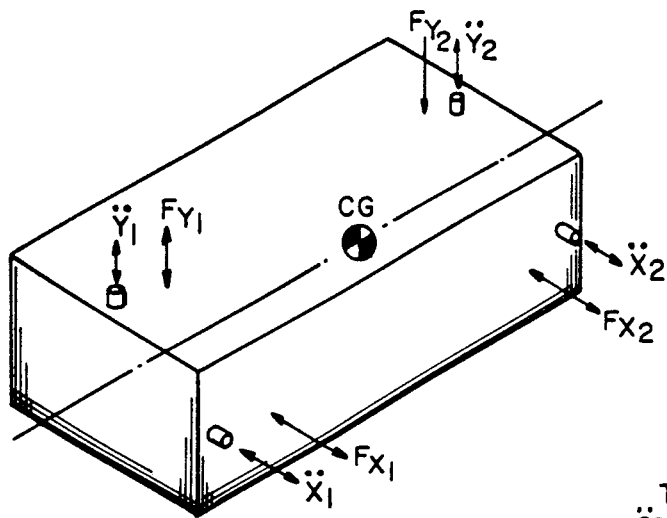
FIG. 9 is a free body diagram in perspective of a vibrating mass.
Figure 10:
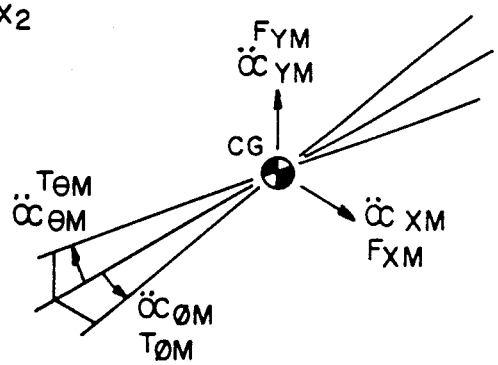
FIG. 10 is a diagram for illustrating the vibration modes of the free body shown in FIG. 9.

The principal vibration modes can be explained with reference to FIGS. 9 and 10. FIG. 9 is a free body diagram of the stator 40 which is considered to be held in place on an elastic foundation. The disturbing forces resulting in accelerations $X_1$, $Y_1$, $X_2$ and $Y_2$ and the forces $F_{X1}$, $F_{Y1}$, $F_{X2}$ and $F_{Y2}$ applied by the electromagnetic bearings are shown by arrows. The forces of the electromagnetic bearings act as restoring forces. The mass of the stator may be considered to be concentrated at CG. A mass and restoring force are the two requirements for a vibrating system. The stator has four rigid body modes of vibration which comprise two translation modes resulting in accelerations $a_{XM}$, $a_{YM}$ and two tilting modes resulting in accelerations $a_{\theta M}$, $a_{\phi M}$ as indicated in FIG. 10. The translation mode accelerations are attenuated by reaction forces $F_{XM}$ and $F_{YM}$. The tilting mode vibrations are attenuated by torques $T_{\theta M}$ and $T_{\phi M}$.

Assuming the center of gravity CG of the stator is half way between the spaced radial bearings, then the relationship between the accelerations measured at the bearings and the accelerations of the transverse vibration modes are as follows:

$$a_{XM} = \tfrac{1}{2}(X_1 + X_2)$$

$$a_{YM} = \tfrac{1}{2}(Y_1 + Y_2)$$

Assuming the distance between the bearings is L, the relationship between the accelerations measured at the bearings and the tilt mode accelerations are as follows:

$$a_{\theta M} = 1/L(X_1 - X_2)$$

$$a_{\phi M} = 1/L(Y_1 - Y_2)$$

These may be represented by the following matrix equation.

$$\begin{bmatrix} a_{XM} \\ a_{YM} \\ a_{\theta M} \\ a_{\phi M} \end{bmatrix} = \begin{bmatrix} \frac{1}{2} & \frac{1}{2} & 0 & 0 \\ 0 & 0 & \frac{1}{2} & \frac{1}{2} \\ \frac{1}{L} & -\frac{1}{L} & 0 & 0 \\ 0 & 0 & \frac{1}{L} & -\frac{1}{L} \end{bmatrix} \cdot \begin{bmatrix} X_1 \\ X_2 \\ Y_1 \\ Y_2 \end{bmatrix}$$

The decoupler 51 uses these or similar relationships to produce the mode signals.

The decoupler 51 may comprise an analog computing circuit comprising a plurality of operational amplifiers configured as multiplying, summing and/or difference amplifiers. The configuration of operational amplifiers to perform these functions including the selection of input and feedback resistors are well understood to those skilled in the art and is further described in numerous texts on such amplifiers and analog computers. The bandwidth of the operational amplifiers for the embodiment being described should be large enough to prevent unwanted attenuation and phase shift of frequencies of the vibrations being controlled.

Each mode signal is applied to an adaptive controller 52, 53, 54, 55 wherein the reaction forces $F_{XM}$, $F_{YM}$ and reaction torques $T_{\theta M}$ and $T_{\phi M}$ attenuating the vibrations in a single mode are produced. It should be understood that each mode signal may represent vibrations at the fundamental frequency and harmonics thereof. The mode related forces and torques are then converted by force translator 56 into four signals $CF_{X1}$, $CF_{X2}$, $CF_{Y1}$ and $CF_{Y2}$ for each electromagnet in each bearing. The forces are summed with the gap control signals in summing junctions 57, 58, 59 and 60.

The matrix operation performed in the force translator 56 is the inverse matrix operation performed in the vibration mode decoupler 51. The force translator 56 may be an analog computing circuit as may be the decoupler 51.

It should be understood that this invention also applies to cancellation of vibrations in systems with additional modes of vibration. In the case of a stator having three radial bearings (for simplicity, assume equally spaced) the matrix equation relating the accelerations at each bearing $X_1$, $Y_1$, $X_2$, $Y_2$, $X_3$, $Y_3$ where the latter correspond to the middle bearing and the six modes comprise translation modes resulting in accelerations $a_{XM}$, $a_{YM}$, two tilting modes $a_{\theta M}$, $a_{\phi M}$, and two bending modes $a_{BXM}$, $a_{BYM}$ is set forth as follows:

$$\begin{bmatrix} a_{XM} \\ a_{YM} \\ a_{\theta M} \\ a_{\phi M} \\ a_{BXM} \\ a_{BYM} \end{bmatrix} = \begin{bmatrix} \frac{1}{2} & \frac{1}{2} & 0 & 0 & 0 & 0 \\ 0 & 0 & \frac{1}{2} & 2 & 0 & 0 \\ \frac{1}{L} & -\frac{1}{L} & 0 & 0 & 0 & 0 \\ 0 & 0 & \frac{1}{L} & -\frac{1}{L} & 0 & 0 \\ \frac{1}{2} & \frac{1}{2} & 0 & 0 & -1 & 0 \\ 0 & 0 & \frac{1}{2} & \frac{1}{2} & 0 & -1 \end{bmatrix} \cdot \begin{bmatrix} X_1 \\ X_2 \\ Y_1 \\ Y_2 \\ X_3 \\ Y_3 \end{bmatrix}$$

The equations relating transverse mode vibrations and tilting mode vibrations are the same. The equations relating accelerations measured at the bearings and bending mode vibrations are as follows:

$$a_{BXM} = \tfrac{1}{2}(X_1 + X_2) - X_3$$

$$a_{BYM} = \tfrac{1}{2}(Y_1 + Y_2) - Y_3$$

Those skilled in the art will recognize that each vibrating device will have to be analyzed for its vibration modes that are forced by the disturbing forces. The particular values for the matrix used in the vibration mode decoupler and its inverse matrix used in the force translator will have to be tailored to the acceleration inputs and the vibration modes.

To this point, the invention has been described ignoring the system coupling dynamics. In practical application, it may not be acceptable to ignore frequency dependent attenuations and phase shifts relating forces and accelerations. For a machine which has force-actuators installed on multiple axes, it is possible to define a machine transfer function, which relates the vibrational acceleration at a second location to forces in the force actuators. This can be represented by the matrix equation:

$$A = T \cdot F \tag{1}$$

where A = acceleration matrix, T = coupling matrix and F = force matrix. The coupling matrix T, which represents the system coupling dynamics, is, in general, complex valued, i.e., frequency dependent.

It would be desirable to use an adaptive controller which has proven to be successful in systems with little or no cross-coupling. For an adaptive controller consisting of a number of independent channels, it is necessary to be sure that each channel acts on an independent degree of freedom. Such independent motions correspond to the eigenmodes of the coupling matrix T. If the matrix T is diagonalizable, then there exists a nonsingular matrix P such that:

$$T = P^{-1} \cdot D \cdot P \tag{2}$$

where D is a diagonal matrix containing the eigenvalues of matrix T. Substituting Equation 2 into Equation 1:

$$A = P^{-1} \cdot D \cdot P \cdot F \tag{3}$$

or by premultiplying both sides of Equation 3 by P:

$$PA = D \cdot P \cdot F \tag{4}$$

If one defines a new acceleration vector V to be:

$$V = P \cdot A \tag{5}$$

and a new force vector G to be:

$$G = P \cdot F \tag{6}$$

then by substituting (5) and (6) into (4) it follows:

$$V = D \cdot G \tag{7}$$

for a four-dimensional system in question Equation 7 becomes:

$$\begin{bmatrix} V_1 \\ V_2 \\ V_3 \\ V_4 \end{bmatrix} = \begin{bmatrix} d_1 & G & 0 & 0 \\ 0 & d_2 & 0 & 0 \\ 0 & 0 & d_3 & 0 \\ 0 & 0 & 0 & d_4 \end{bmatrix} \cdot \begin{bmatrix} G_1 \\ G_2 \\ G_3 \\ G_4 \end{bmatrix}$$

Thus the accelerations $V_1$, $V_2$, $V_3$ and $V_4$ are independent of each other and are caused by force components $G_1$, $G_2$, $G_3$ and $G_4$. So the matrix P takes the coupled accelerations and projects them into accelerations which are uncoupled. Then a multi-channel adaptive controller can operate on these independent variables on an independent basis and generate vibration cancelling force signals. However, the magnetic bearings must be commanded with forces corresponding to the physical coordinate system of the bearings. Therefore, the force control vector $F_{Cl}$ must be computed using the inverse of Equation 6, i.e., $$F_C = P^{-1} \cdot G_C \qquad (11)$$

At any frequency of interest the dynamic response matrix T can be measured by successively applying probing force signals to one actuator at a time and detecting the resulting variations of the measured accelerations. Standard signal averaging techniques are used to reduce the effects of measurement noise.

From the measured T matrix we compute then the matrices P and $P^{-1}$ using standard diagonalization practices. The elements of these matrices are, in general, complex.

The modal decomposition, Equation 5 and its inverse, Equation 11, can be implemented in the decoupler 51 and force translator 56 using analog active filters for systems with few degrees of freedom and when only the fundamental frequency and its first harmonic are concerned. In general, these transformations will be implemented digitally in a digital computer or digital signal processor.

Figure 11:
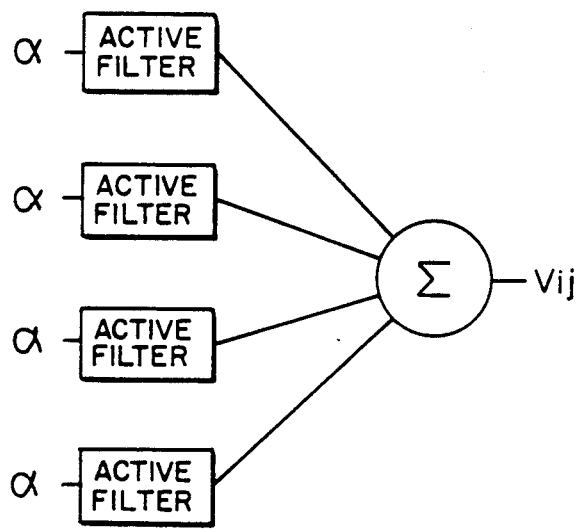
FIG. 11 is a schematic diagram of a portion of a circuit for implementing the matrices that perform as mode decouplers and force translators.

Referring to FIG. 11, for a 4×4 system, an element Pij would be implemented with a network comprising active filters and a summing junction. Integrated circuits such as National Semiconductor MFIO can be configured as an all pass filter with appropriate frequency dependent phase delays.

Adaptive Controller

The general theory of adaptive controllers is set forth in the Chaplin and Smith patent. An adaptive controller suitable for the practice of this invention is the NCT 2000 sold by Noise Cancellation Technologies, Inc., Great Neck, N.Y. The NCT 2000 is capable of significant reductions in noise and vibration levels where there is an unwanted repetitive noise vibration in the range of 0 to 600 Hz. The number of signal channels in the NCT 2000 system must be at least as great the number of axes (modes) of vibrational control.

Force Actuators

In a preferred embodiment the force actuators are active magnetic bearings such as the type disclosed in Habermann U.S. Pat. No. 4,353,602 and Brunet et al. U.S. Pat. No. 4,583,031. The force actuator could also be a fluid actuated device so long as the frequency response valve were compatible with the range of frequencies to be attenuated.

Sensors

Three types of sensors are used in the proposed magnetic bearing system. These include shaft position (gap) sensors, a rotor speed sensor, and accelerometers.

For sensing the gap between rotor and stator, the inductive or eddy-current type of displacement sensor is preferred. Sensors on opposite sides of the shaft are connected in a bridge configuration across a high frequency source of excitation. A 15 kHz electronic sine wave oscillator and power amplifier for the excitation energy are preferred. The voltage at the mid-tap of the two sensors is a carrier-suppressed, amplitude modulated signal containing the desired rotor position information. A demodulator integrated circuit and an active filter convert this signal into a dc voltage which is used in the magnetic bearing rotor position control loops. A similar technique is used for sensing the axial position of the thrust bearing rotor relative to its stator.

The rotor speed sensor is the magnetic pickup type. This sensor when located close to gear teeth on the rotor provides an ac voltage whose frequency is proportional to the speed of rotation. This frequency signal is used as a reference for the adaptive vibration control system.

Accelerometers are attached at the mounting surface of the machine and provide feedback signals to the adaptive vibration control system. A high sensitivity type of piezoelectric accelerometer with built-in amplifier such as the Columbia Research, Inc. Model 8501 may be used.

In the preferred embodiment, accelerometers are mounted on the vibrating apparatus so as to sense vibrations in each of the axes of control. For example, in the four degrees of freedom system of FIGS. 8 and 9, an accelerometer would be oriented vertically on each bearing housing of the machine and another two would be oriented horizontally on the bearing housings. Alternatively, if one were primarily concerned with controlling horizontal and vertical vibrations at the base of the machine, the accelerometers could be located at multiple locations on the base with two mounted to sense horizontal and two mounted to sense vertically. The only restriction on mounting arrangement is that the amplitudes and phases of the fundamental and harmonic components of the independent modes of vibration of concern can be uniquely ascertained from a combination of the signals measured.

Having thus described my invention with the detail and particularity required by the Patent Laws, what is claimed and desired to be protected by Letters Patent is set forth in the following claims.

I claim:

1. An apparatus for cancellation of vibrations in a device comprising:
    sensor means for measuring vibration at a plurality of locations and for generating vibration signals indicative of said vibrations,
    first matrix means for combining the vibration signals from said plurality of locations to produce mode signals indicative of individual modes of vibration of said device,
    adaptive means in response to said mode signals for generating mode vibration attenuation signals corresponding to said mode signals, means for generating vibration attenuation forces applied to a reaction mass, and second matrix means for combining said mode vibration attenuation signals to produce vibration attenuation signals for application to said means for generating vibration attenuation forces.

2. An apparatus for cancellation of vibrations in a stator device supporting a rotor through a plurality of bearings comprising:

sensor means for measuring vibration in two radial directions at at least two bearings and for generating vibration signals indicative of said vibrations, first matrix means for combining the vibration signals from said bearings to produce mode signals indicative of individual modes of vibration of said stator device, adaptive means in response to said mode signals for generating mode vibration attenuation signals corresponding to said mode signals, means comprising electromagnetic bearings for generating vibration attenuation forces applied to said rotor in the directions along which said vibrations are measured, and second matrix means for combining said mode vibration attenuation signals to produce vibration attenuation signals for application to said means for generating vibration attenuation forces.

3. An apparatus for cancellation of vibrations in a device comprising:

sensor means for measuring vibration at a plurality of locations and for generating vibration signals indicative of said vibrations, first matrix means for combining the vibration signals from said plurality of locations to produce mode signals indicative of individual modes of vibration of said device, means for transforming the mode vibration signals into component mode signals corresponding to a fundamental frequency and harmonics thereof, adaptive means in response to said component mode signals for generating component attenuation signals corresponding to said mode signals, means for transforming said component attenuation signals into composite mode attenuation signals, electromagnetic means for generating vibration attenuation forces applied to a reaction mass, and second matrix means for combining said mode vibration attenuation signals to produce vibration attenuation signals for application to said means for generating vibration attenuation forces.

4. An apparatus for cancellation of vibrations in a stator device supporting a rotor through a plurality of electromagnetic bearings wherein the rotor transmits vibration generating forces to the stator at the frequency of rotation of the rotor and harmonics thereof comprising:

sensor means for measuring vibration at a plurality of locations and for generating vibration signals indicative of said vibrations, first matrix means for combining the vibration signals from said plurality of locations to produce mode signals indicative of individual modes of vibration of said device, means for generating a fundamental signal indicative of frequency of rotation of the rotor, means responsive to said fundamental signal for transforming the mode vibration signals into component mode signals corresponding to the frequency of the fundamental signal and harmonics thereof, adaptive means in response to said component mode signals for generating component attenuation signals corresponding to said component mode signals, means for transforming said component attenuation signals into composite mode attenuation signals, electromagnetic means for generating vibration attenuation forces applied to said rotor, and second matrix means for combining said mode vibration attenuation signals to produce vibration attenuation signals for application to said means for generating vibration attenuation forces.

5. Apparatus according to claims 1, 2, 3 or 4 wherein the second matrix means performs the inverse matrix operation as performed by the first matrix means.

6. Apparatus according to claims 1, 2, 3 or 4 wherein the adaptive means varies the phase and amplitude of the attenuation signals until the vibrations are substantially entirely cancelled.

7. Apparatus according to claims 1, 2, 3 or 4 wherein the first matrix means combines the vibration signals to produce modes signals indicative of at least two transverse vibration modes and at least two tilting vibration modes.

8. Apparatus according to claim 7 wherein the first matrix means combines the vibration signals to produce signals indicative of at least two bending modes.

9. Apparatus according to claims 2 or 4 wherein the electromagnetic bearings each have spaced magnetic poles and the vibration sensors comprise accelerometers for measuring the acceleration of the stator in the directions of the spaced magnetic poles.

10. Apparatus according to claim 9 wherein the first matrix means combines the vibration signals to produce mode signals indicative of transverse vibrations in the perpendicular planes defined by the bearing poles and indicative of tilting vibrations in the planes defined by the bearing poles.

11. Apparatus according to claims 1, 2, 3 or 4 wherein the first and second matrix means have complex valued matrix elements to account for system dynamics.

* * * * *

UNITED STATES PATENT AND TRADEMARK OFFICE
CERTIFICATE OF CORRECTION

PATENT NO. : 4,999,534

DATED : March 12, 1991

INVENTOR(S) : Nikos P. Andrianos

It is certified that error appears in the above-identified patent and that said Letters Patent is hereby corrected as shown below:

Title Page:
Abstract Line 2 after "matrix" insert --means--.

Abstract Line 5 "element" should read --means--.

Abstract Line 7 after "matrix" insert --means--.

Figure 1:
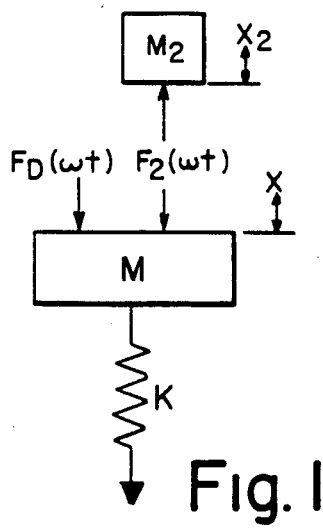
FIG. 1 is a schematic diagram for illustrating the theory of using compensating forces to attenuate vibrations caused by periodic disturbing forces.
Figure 2:
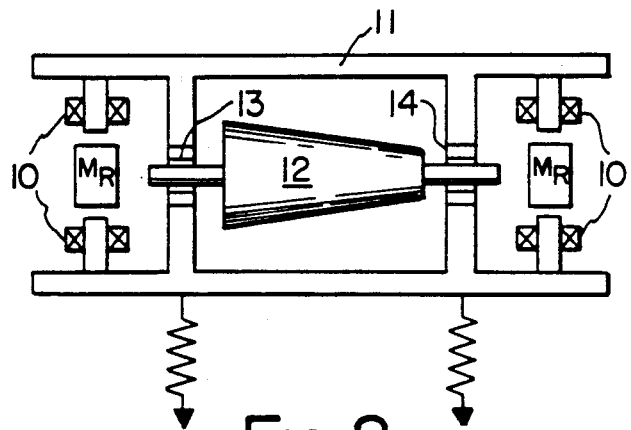
FIG. 2 is a schematic illustrating the use of auxiliary reaction mass for attenuating vibrations in a rotating machine.
Figure 3:
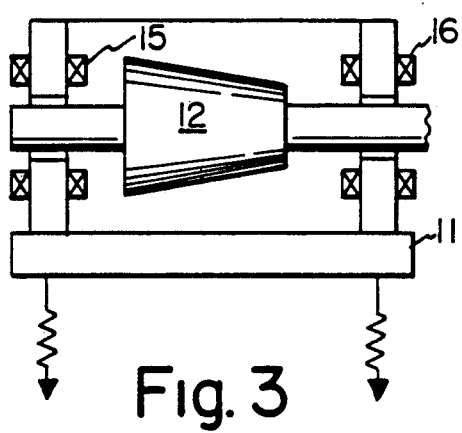
FIG. 3 illustrates a prior art rotating machine having active magnetic bearings.
Figure 5:
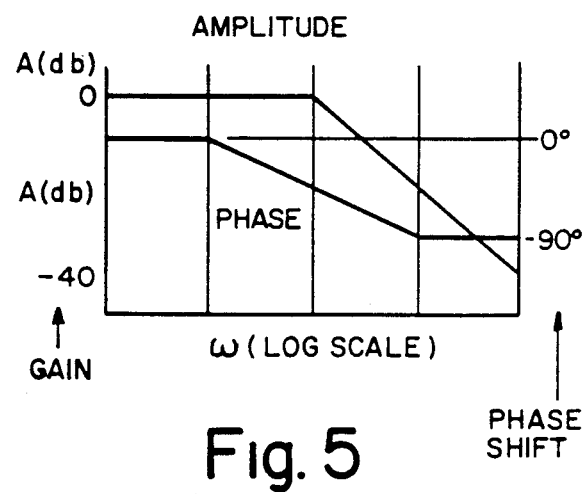
FIG. 5 is a graph illustrating the effect of frequency on gain and phase shift for a simple transfer function.
Figure 4:
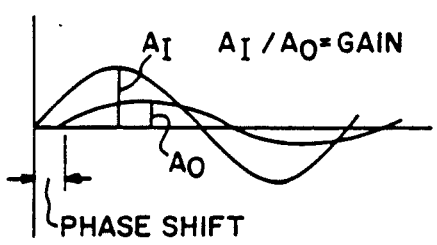
FIG. 4 is a graph illustrating gain and phase shift.
Figure 7:
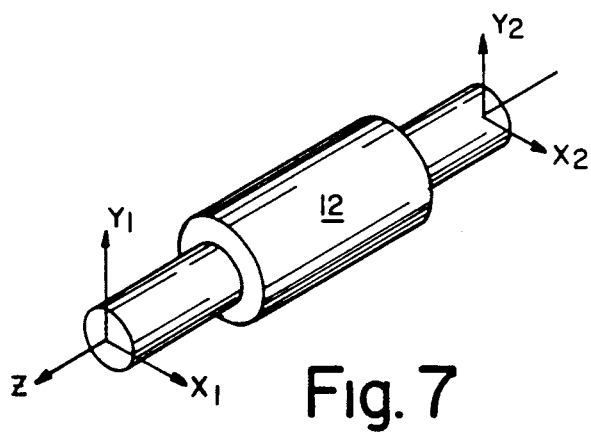
FIG. 7 schematically illustrates the degrees of freedom associated with a rotor having two spaced radial bearings.

Column 1 Line 30 "FIG. 1.," should read --FIG. 1.--.

Column 5 Line 59 "9.;" should read --9;--.

Column 7 Line 49 after "comprise" insert --two--.

Column 9 Line 20 "$F_{C1}$" should read --$F_C$--.

Column 9 Line 60 after "great" insert --as--.

Column 10 Line 1 "valve" should read --value--.

Claim 7 Line 37 Column 12 "modes" should read --mode--.

Signed and Sealed this

Eighth Day of December, 1992

Attest:

DOUGLAS B. COMER

*Attesting Officer*   *Acting Commissioner of Patents and Trademarks*